A. W. McCURDY.
PHOTOGRAPHIC FILM.
APPLICATION FILED JUNE 9, 1917.
1,261,747.
Patented Apr. 2, 1918.
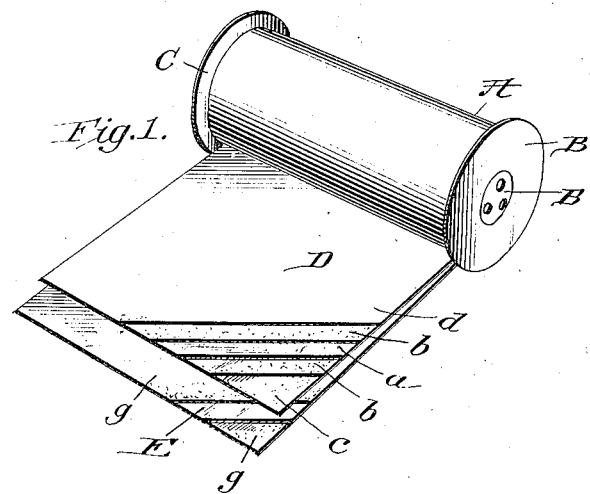
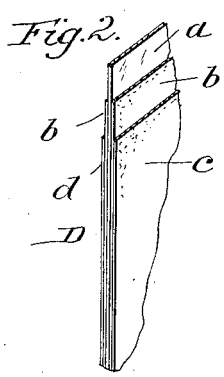
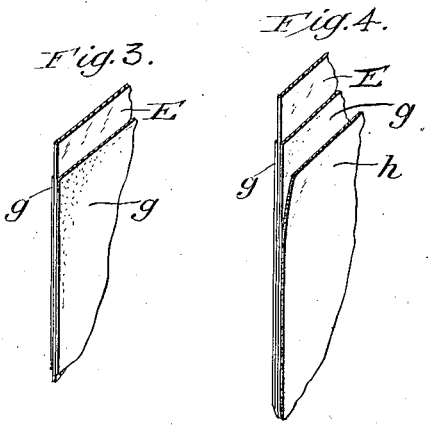
Inventor:
Arthur W. McCurdy,
By Dodge & Sons,
Attorneys

UNITED STATES PATENT OFFICE.

ARTHUR W. McCURDY, OF VICTORIA, BRITISH COLUMBIA, CANADA.

PHOTOGRAPHIC FILM.

1,261,747.  Specification of Letters Patent.  Patented Apr. 2, 1918.

Application filed June 9, 1917. Serial No. 173,818.

*To all whom it may concern:*

Be it known that I, ARTHUR W. McCURDY, a subject of the King of England, residing at Victoria, British Columbia, in the Dominion of Canada, have invented a certain new and useful Improvement in Photographic Films, of which the following is a specification.

This invention pertains to photographic roll films, film packs, and moving picture films, particularly to those of the "daylight-loading" type, including such as are "non-curling", or "autographic", or both, as well as those which are neither.

The purpose of the invention is to protect the film against injury through staining, mottling, scratching, or like cause, by rendering it incapable of absorbing deleterious matters, or of being easily scratched or marred through friction or contact with other bodies.

The accompanying drawings illustrate my improvements, in which:

Figure 1 is a perspective view of a spooled day-light loading film embodying my improvements in the complete or preferred form;

Fig. 2 is an enlarged sectional view of the film proper before development;

Fig. 3 is an enlarged section of the light-excluding paper with its water-proof coatings on front and rear faces; and Fig. 4 is a similar sectional view of the light-excluding paper showing also the transfer or carbon sheet used in the case of the "autographic" film.

It will of course be understood that the thickness of the several layers making up the film and the light-excluding paper is greatly exaggerated, being merely for purposes of illustration and ready explanation.

In the practical or commercial evolution of the photographic film with a nitro-cellulose foundation, such foundation was in the earlier days coated on one face only with gelatin or like substance, to which the sensitizing preparation was applied. The back of the film was under such construction, smooth, firm, and free from danger of stains or scratching, and could be washed clean with the same facility as an ordinary glass plate. But gelatin is exceedingly sensitive to temperature changes and to varying atmospheric conditions, and when applied to one face only of a film, causes the film to curl or roll up into a small and close cylinder, particularly after development.

To overcome this troublesome curling, both faces of the cellulose foundation were later coated alike with gelatin, the coating on each face neutralizing the curling tendency of that on the other face, and causing the film to lie flat and smooth when unrolled, both before and after development and fixation. The gelatin coating of the rear face lying in contact with the light-excluding paper, is found to absorb therefrom sizing, dye-stuff, or some other material or agent, particularly if the film be subjected to changing conditions of atmosphere, temperature, etc. The matters absorbed produce a mottled effect when the film is developed and fixed, and in many cases preclude or retard the proper action of developing and fixing agents. A like effect is produced by the oil, wax, or pigment of the carbon or transfer paper used in the autographic film, when it penetrates the paper envelop and is absorbed by the face of the film.

When a film is coiled upon its spool, the outer face of the light-excluding paper comes into contact with the sensitized face of the film, and affects that face in the same manner as it does the back.

To meet these conditions I water-proof the light-excluding paper, so that it may not give off anything that might impair either the face or back of the film, and I also water-proof the rear face of the film to prevent it from absorbing any matter which might stain or discolor it. As the film must, when developed and fixed, be transparent, it is necessary that the water-proofing agent or composition used upon the film be transparent, and it is likewise important that it be highly flexible and quite tough or tenacious, so that the film may be rolled upon a spool, or wound from one spool or reel to another without breaking, cracking, or peeling off. Nitro-cellulose is found to fulfil admirably these conditions, but other water-proofing agents may be used if preferred, as for instance, cellulose acetate. As stated, these coating agents or preparations are suggestive merely, but are those which at this time I deem best suited to the purpose of water-proofing and protecting both the light-excluding paper and the film proper, prior to development.

When water-proofed the light-excluding paper is incapable of absorbing moisture from the atmosphere, and hence is not liable, as is the unprotected paper, to swell or soften in moist and warm climates, or to impart moisture to the film, and it is prevented from adhering to the back of the film while and after developing the film. The adhesion of the paper to the film under conditions heretofore obtaining has been a source of very considerable trouble and annoyance, often resulting in serious impairment of the film, and sometimes wholly destroying the same. By water-proofing the back or rear face of the film, it is precluded from receiving permanent imprints of the fingers during development, is freed from liability of dust or foreign matters adhering thereto, and may be freely washed to remove superficial finger prints, marks, or stains of any kind, which owing to the protecting or water-proofing film of cellulose nitrate or acetate, lie only upon the outer surface of the latter and are readily removable therefrom.

The manner of applying the water-proof film or coating to the paper and to the photographic film proper may be varied at will. The operation may be performed at the factory in the regular course of manufacture, or, (and particularly in the case of films already on the market), this may be performed by users of the film in any simple and convenient way.

Referring to Fig. 1 of the drawings, A indicates a roll film carried by a spool B having the usual disks or heads C, D indicating the film proper and E the light-excluding paper, wrapper, or envelop. The film D comprises a foundation sheet or pellicle $a$ of a cellulose derivative or other transparent substance of like general character. Usually and preferably this will be of nitro-cellulose for general photographic purposes, though for moving picture films, or films which are likely to be brought close to a lamp or otherwise subjected to relatively high temperatures, cellulose acetate will be found preferable in that it is non-inflammable. The greater expense of cellulose acetate, however, will suggest the use of cellulose nitrate for ordinary commercial films not likely to be subjected to undue heat. To the front and rear faces of the foundation $a$ is applied a layer or film $b$ of gelatin, or the like, that on the front or inner face being designed to receive the sensitizing preparation $d$, while that on the rear face is for the purpose of counteracting or neutralizing the tendency of the film to curl or roll into a small or close cylinder when subjected to the ordinary temperature of the atmosphere. The sensitizing agents are, of course, applied in the form of an emulsion, the gelatin or like substance serving to receive and hold the same in uniformly distributed atoms or particles.

To prevent the rear gelatin coating $b$ from absorbing moisture, or becoming stained, scratched, or marred in any manner while wet and soft, or otherwise, a film or layer $c$ of cellulose nitrate, cellulose acetate, or equivalent thin, flexible, transparent, and water-proof coating is applied. (See Fig. 2.) This being applied to the film in liquid form, spreads itself readily and easily over the whole surface of the gelatin, or the like, and serves effectually to protect the same not only from matters encountered during development, or from any pigment, oil, wax, or other injurious substance which it might otherwise take up from the transfer sheet used with autographic films, or which might be given off by the light-excluding paper.

In Fig. 3 the light-excluding paper E is shown with a water-proofing layer or film $g$ of cellulose nitrate or acetate on both front and back faces, and in Fig. 4 there is shown a strip or sheet $h$ of carbon or transfer paper such as is used in connection with the autographic film roll. By water-proofing both faces of the light-excluding paper E and also the back of the film, a double security against injury to the film is afforded, and in practice I deem such double precaution advisable.

As above indicated, I contemplate the use of known equivalents for the cellulose nitrate, cellulose acetate, gelatin, and paper employed, and the claims are hence to be read with that understanding.

It should be observed, however, that the water-proof coating should be of relatively tough and pliable nature, capable of making somewhat short bends or folds without liability of cracking or breaking. Most varnishes or preparations having a resinous base are brittle or friable, and hence not well suited to the purpose indicated, but nitro-cellulose and cellulose acetate are found admirably adapted to the purpose.

Having thus described my invention what I claim is:—

1. A flexible photographic film provided with a light-excluding envelop having a face coated with a water-proofing derivative of cellulose, and thereby rendered waterproof.

2. In combination with a flexible photographic film, a light-excluding envelop having its faces coated with a waterproof derivative of cellulose, and thereby rendered incapable of absorbing or giving off moisture.

3. A photographic roll cartridge provided with a light-excluding envelop having its faces coated with a water-proofing material without affinity for the pigment-carrying facing of a transfer sheet such as is used in autographic film cartridges.

4. A photographic roll cartridge comprising a transparent foundation strip bearing on its inner face a sensitized coating; a light-excluding envelop placed outside of said foundation strip; and an interposed opaque pigment-bearing transfer sheet, the envelop having its faces coated with a water-proofing material devoid of affinity for the pigment or other ingredients of the transfer sheet, said coating serving to prevent the envelop from imparting to the sensitized surface of the foundation strip, moisture, pigment, or other contents of the envelop.

5. A photographic film provided with a light-excluding envelop having that surface which lies next to the image-receiving face of the film coated with a waterproof derivative of cellulose.

6. A daylight-loading photographic film, comprising a foundation strip of flexible, tough, and transparent material coated on its front and rear faces with a layer of gelatin, the front gelatin surface being sensitized to enable it to receive and hold an image, and the rear gelatin face being water-proofed to protect it against injury through absorption, pressure, or abrasion; and a light-excluding envelop.

7. A photographic film comprising, in combination, a foundation sheet of tough, flexible, and transparent material coated on its front and rear faces with gelatin, the front gelatin face being sensitized and the rear gelatin face being water-proofed; and a light-excluding envelop having its outer face water-proofed to prevent it giving off to the film injurious matters of any kind which said envelop may contain.

8. A photographic film comprising, in combination, a foundation sheet of tough, flexible, transparent material coated on opposite faces with gelatin, the front gelatin face being sensitized and the rear gelatin face being provided with a water-proof coating; and a light-excluding envelop having both its inner and its outer face water-proofed to prevent absorption of moisture and to preclude the giving off of pigment, sizing, or other contents which might impair the contacting face of the film.

9. A photographic film comprising, in combination, a tough, flexible, and transparent foundation sheet having its front and rear faces each provided with a coating of gelatin, the front gelatin face being sensitized to enable it to receive and hold an image, and the rear gelatin face being water-proofed; a transfer sheet with its back in contact with the water-proofed face of the film; and a water-proof light-excluding envelop outside the transfer sheet, substantially as and for the purpose set forth.

In testimony whereof I have signed my name to this specification.

ARTHUR W. McCURDY.